US012748610B2

(12) United States Patent
Tsirkin

(10) Patent No.: US 12,748,610 B2
(45) Date of Patent: Sep. 29, 2026

(54) DELAYING INTERRUPTS FOR VIRTUAL MACHINES

(71) Applicant: RED HAT, INC., Raleigh, NC (US)

(72) Inventor: Michael Tsirkin, Yokneam (IL)

(73) Assignee: Red Hat, Inc., Raleigh, NC (US)

( * ) Notice: Subject to any disclaimer, the term of this patent is extended or adjusted under 35 U.S.C. 154(b) by 801 days.

(21) Appl. No.: 17/943,960

(22) Filed: Sep. 13, 2022

(65) Prior Publication Data

US 2024/0086220 A1 Mar. 14, 2024

(51) Int. Cl.
*G06F 9/455* (2018.01)
*G06F 9/48* (2006.01)

(52) U.S. Cl.
CPC ........ *G06F 9/45558* (2013.01); *G06F 9/4812* (2013.01); *G06F 2009/45575* (2013.01)

(58) Field of Classification Search
CPC ............... G06F 9/45558; G06F 9/4812; G06F 2009/45575
USPC ............................................................. 718/1
See application file for complete search history.

(56) References Cited

U.S. PATENT DOCUMENTS 8,392,918 B2 3/2013 Mann
10,180,855 B1 * 1/2019 Koryakin .............. G06F 9/4831
10,310,887 B2 6/2019 Tsirkin et al.
10,452,572 B2 10/2019 Lu et al.
10,713,195 B2 7/2020 Tsai et al.
10,949,243 B2 3/2021 Tsirkin
11,281,487 B2 3/2022 Tsirkin
2010/0023666 A1 * 1/2010 Mansell ................ G06F 9/4812 718/1
2011/0145461 A1 * 6/2011 Zhao ....................... G06F 9/505 710/267
2016/0117190 A1 * 4/2016 Sankaran ................ G06F 13/24 710/267
2017/0083363 A1 * 3/2017 Li ............................. G06F 9/48
2017/0161096 A1 * 6/2017 Loh ......................... G06F 13/24
2019/0114196 A1 * 4/2019 Aggarwal ........... G06F 11/2007

FOREIGN PATENT DOCUMENTS

EP 3685262 B1 * 12/2025 ............. G06F 9/505

OTHER PUBLICATIONS

Kilic et al., "Overcoming Virtualization Overheads for Large-vCPU Virtual Machines," Mascots, Oct. 2018: pp. 369-380, <https://www.researchgate.net/publication/328028718_Overcoming_Virtualization_Overheads_for_Large-CPU_Virtual_Machines>.

* cited by examiner

*Primary Examiner* — Pierre Vital
*Assistant Examiner* — Daniel Trainor
(74) *Attorney, Agent, or Firm* — Kilpatrick Townsend & Stockton LLP

(57) ABSTRACT

A computing device can detect an interrupt associated with a virtual machine. Based on detecting the interrupt, the computing device can determine whether the virtual machine is in an idle state. Based on determining that the virtual machine is in the idle state, the computing device can delay the interrupt by storing the interrupt in an interrupt register for a period of time and preventing the interrupt from being transmitted to the virtual machine during the period of time. After storing the interrupt in the interrupt register, the computing device can determine that the virtual machine is in an awake state. In response to determining that the virtual machine is in the awake state, the computing device can transmit the interrupt from the interrupt register to the virtual machine.

20 Claims, 3 Drawing Sheets

DELAYING INTERRUPTS FOR VIRTUAL MACHINES

TECHNICAL FIELD

The present disclosure relates generally to virtual machines. More specifically, but not by way of limitation, this disclosure relates to delaying interrupts for virtual machines.

BACKGROUND

A virtual machine can be a virtual emulation of a physical computer system. For example, virtual machines can include virtualized hardware, such as virtual processors, virtual memories, and virtual storage devices. Virtual machines can also execute computer programs, often referred to as guest programs. Each virtual machine can be allotted an amount of computing resources, such as processing power and memory, that the virtual machine can use to perform operations.

Virtual machines can be deployed on a host machine using software, such as a hypervisor. In some cases, virtual machines may execute on top of an operating system (e.g., Red Hat Enterprise Linux) running on the underlying physical host. The virtual machine may also include its own operating system that may be the same as or different from the underlying host operating system.

DETAILED DESCRIPTION

Figure 1:
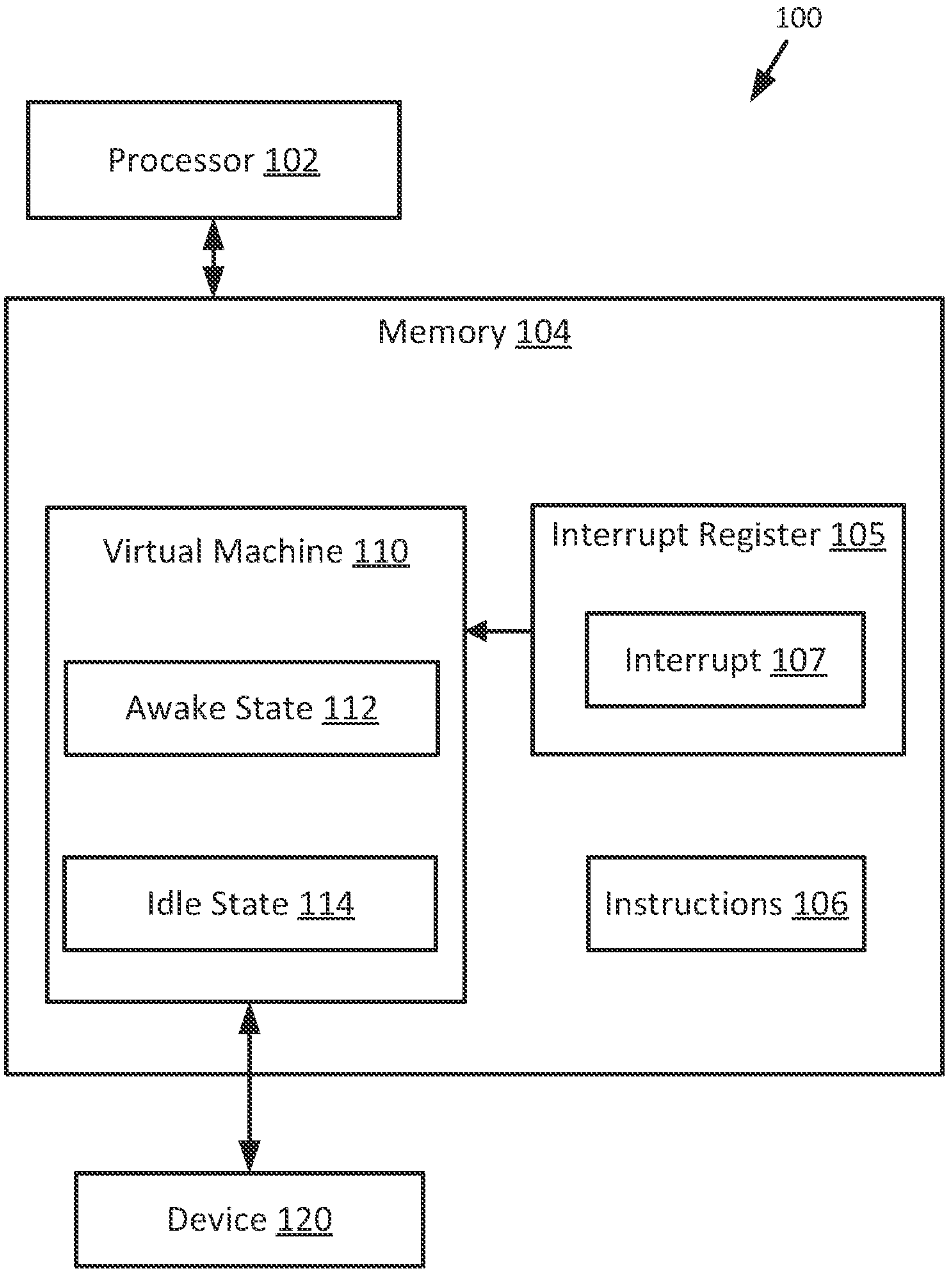
FIG. 1 is a block diagram of an example of a system that can delay interrupts for virtual machines according to some aspects of the present disclosure.

Devices can be added to a virtual machine in a process referred to as hot plugging. Hot plugging can involve adding a device (e.g., a physical or virtual device) to a virtual machine without significant interruption to the operation of the virtual machine. Hot plugging a device may not require a restart of the virtual machine or computing device. Hot plugging can be especially useful for systems that execute continuously, such as a server. Examples of hot-pluggable devices can include hard disk drives or solid-state drives, which can be added to a storage system associated with the virtual machine. Devices can also be removed from a virtual machine in a process referred to as hot unplugging. Hot unplugging a device can involve removing a device from a virtual machine without interrupting the operation of the virtual machine. Hot unplugging the device may not require a restart of the virtual machine or computing device. Hot plugging devices into a virtual machine and hot unplugging devices from a virtual machine can produce interrupts. If the virtual machine is in an idle state when attempting to perform hot plugging or hot unplugging, the corresponding interrupt can wake up the virtual machine. But, waking up the virtual machine can consume a significant amount of computing resources and have a large amount of overhead.

As one particular example, it may be desirable to transfer a device from a first virtual machine to a second virtual machine by hot unplugging the device from the first virtual machine and hot plugging the device into the second virtual machine. This may produce two interrupts—a first interrupt associated with hot unplugging the device for the first virtual machine and a second interrupt associated with hot plugging the device into the second virtual machine. If the second virtual machine is idle, transmitting the second interrupt immediately to the second virtual machine can cause it to wake up. Waking up an idle virtual machine can consume large amounts of computing resources, such as processing power or memory. Additionally, adding certain types of devices to a virtual machine prematurely can create unnecessary network traffic and other problems. For instance, adding a device of a certain type to a virtual machine can cause the virtual machine to generate undesired requests for external resources, or can cause the virtual machine to accept undesired requests to execute processes or perform tasks associated with the device. As one particular example, adding a network card to the virtual machine can cause the network card to accept jobs from a network that may be coupled to the virtual machine.

Some examples of the present disclosure can overcome the aforementioned problems by delaying an interrupt that is to be transmitted to a virtual machine until after the virtual machine is awoken from an idle state. Delaying the interrupt can enable the computing device to add a device to the virtual machine or remove a device from the virtual machine while also preventing the interrupt from waking up the idle virtual machine. For example, delaying the interrupt can enable the computing device to hot plug or hot unplug devices with respect to the idle virtual machine without causing the virtual machine to wake up. Preventing the interrupt from waking the virtual machine by delaying the interrupt can prevent the computing device from consuming excessive amounts of computing resources and creating unnecessary network traffic.

In some examples, the computing device can determine that a virtual machine to which an interrupt is to be transmitted is in an idle state. For example, the computing device can include a hypervisor that can track the state of the virtual machine. Upon determining that the virtual machine is in the idle state, the computing device can delay the interrupt by storing the interrupt in an interrupt register for a period of time. For example, the computing device can store the interrupt in a posted interrupt register of a central processing unit (CPU) that may be associated with the virtual machine. During the period of time, the computing device can prevent the interrupt from being transmitted to the virtual machine. At a later point in time, the computing device can determine that the virtual machine is in an awake state. For example, the hypervisor can monitor the state of the virtual machine and determine that it has transitioned into an active (e.g., awake) state. Upon determining that the virtual machine is in the awake state, the computing device can transmit the interrupt from the interrupt register to the virtual machine.

As mentioned above, the interrupt can be associated with adding a device to the virtual machine or removing a device from the virtual machine. In some examples, the device may be a physical device, such as a network card or a hard drive. In other examples, the device may be a virtual device, such as a virtual storage device or virtual network card.

In some examples, the computing device may only delay interrupts associated with certain types of devices. More specifically, the computing device can determine that the interrupt is associated with a certain type of device. For instance, the computing device can determine that the interrupt is associated with adding a network card to a virtual machine. For certain types of devices like the network card, it may be desirable to delay the interrupt by storing the interrupt in the interrupt register, whereas for other types of storage devices it may be desirable to immediately transmit the interrupt. For example, adding certain hardware components (e.g., a network card) to the virtual machine can cause the virtual machine to begin performing tasks like accepting data packets from a network. It may be desirable to prevent that from happening. So, the computing device can detect an interrupt, determine a type of device associated with the interrupt, and determine whether the device is of a particular type for which the interrupt is to be delayed. To make this determination, the computing device may consult a predefined list of devices for which interrupts are to be delayed. If the device is of a particular type for which the interrupt is to be delayed, the computing device can delay the interrupt by storing the interrupt in the interrupt register until an event occurs, such as the virtual machine waking up. If the device is of a particular type for which the interrupt is not to be delayed, the computing device can enable the interrupt to be immediately transmitted to the virtual machine (e.g., without the delay).

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 that can delay interrupts for virtual machines according to some aspects of the present disclosure. The system 100 can include a processor 102 coupled to a memory 104. The processor 102 can include one processor or multiple processors. Examples of the processor 102 include a Field-Programmable Gate Array (FPGA), an application-specific integrated circuit (ASIC), and a microprocessor. The processor 102 can execute instructions 106 stored in the memory 104 to perform one or more operations. In some examples, the instructions 106 can include processor-specific instructions generated by a compiler or an interpreter from code written in any suitable computer-programming language, such as C, C++, C #, and Java.

The memory 104 can include one memory device or multiple memory devices. The memory 104 can be volatile or non-volatile, in that the memory 104 can retain stored information when powered off. Examples of the memory 104 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processor 102 with the instructions 106 or other program code. Non-limiting examples of a computer-readable medium include magnetic disks, memory chips, ROM, random-access memory (RAM), an ASIC, a configured processor, optical storage, or any other medium from which a computer processor can read the instructions 106.

The system 100 can include a virtual machine 110. The virtual machine 110 can be a software virtualization of a physical computer. The virtual machine 110 can include virtualized hardware, such as virtual processors, virtual memories, and virtual storage devices. Virtual machine 110 can also execute computer programs, often referred to as guest programs, to perform one or more computing operations.

In some examples, the processor 102 can receive or generate an interrupt 107 associated with the virtual machine 110. For example, the interrupt 107 can be associated with adding a device 120 to the virtual machine 110. For instance, the processor 102 can generate the interrupt 107 in response to an attempt to hot plug the device 120 into the virtual machine 110. Alternatively, the interrupt 107 can be associated with removing the device 120 from the virtual machine 110. For instance, the processor can generate the interrupt 107 in response to an attempt to hot unplug the device 120 from the virtual machine 110.

In some examples, virtual machine 110 may be in an idle state while the system is attempting to add or remove the device 120. While in the idle state 114, execution of the virtual machine 110 can be paused. In some such examples, the processor 102 can determine that the virtual machine 110 is in the idle state 114. For example, the processor 102 can transmit a request to a hypervisor that is managing the virtual machine 110 to obtain state information associated with the virtual machine 110.

Normally, the interrupt 107 may be immediately transmitted to the virtual machine 110. But in some examples, upon determining that the virtual machine 110 is in the idle state 114, the processor 102 can delay the interrupt 107 by storing the interrupt 107 in an interrupt register 105 for a period of time. For example, the processor 102 can store the interrupt 107 in a posted interrupt register that may be part of the processor 102. During the period of time, the processor 102 can prevent the interrupt 107 from being transmitted to the virtual machine 110.

At a later point in time, the processor 102 can determine that the virtual machine 110 is in an awake state 112. For example, the processor 102 can obtain additional state information from the hypervisor associated with the virtual machine 110, where the additional state information may now indicate that the virtual machine 110 is awake. In response to determining that the virtual machine 110 is in the awake state 112, the processor 102 can transmit the interrupt 107 from the interrupt register 105 to the virtual machine 110. In this way, the interrupt 107 can be delayed until the virtual machine 110 wakes up for another reason, to prevent the virtual machine 110 from waking up simply due to the interrupt 107. This can reduce wakeup overhead and the consumption of computing resources associated with the virtual machine 110.

Once the processor 102 has transmitted the interrupt 107 to the virtual machine 110, the virtual machine 110 can be ready to add or remove the device 120. In some examples the device 120 can be a hardware device 120, such as a network card, solid state drive, hard disk drive, or any other suitable hardware device 120. Alternatively, the device 120 can be a virtual device 120. The virtual device 120 can include a program executing on the processor 102 that can simulate the functionality of a hardware device 120. For example, the virtual device 120 can include a virtual processor 102, a virtual memory 104, a virtual network card, or any other suitable virtual device 120 that can couple with the virtual machine 110.

In some examples, the processor 102 can hot plug the device 120 into the virtual machine 110. Hot plugging the device 120 into the virtual machine 110 can involve adding the device 120 to the virtual machine 110 without shutting down the virtual machine 110 or causing the virtual machine 110 to restart. In other words, the device 120 can be hot plugged into the virtual machine 110 during a runtime of the virtual machine 110. Similarly, the processor 102 can hot unplug the device 120 from the virtual machine 110. Hot unplugging the device 120 from the virtual machine 110 can involve removing the device 120 from the virtual machine 110 without shutting down the virtual machine 110 or causing the virtual machine to restart. The device 120 can be hot unplugged from the virtual machine 110 during a runtime of the virtual machine 110. Hot plugging the device 120 or hot unplugging the device 120 may cause interrupts (e.g., interrupt 107) to be generated. The interrupts can be handled as discussed above, for example by delaying them when the corresponding virtual machine 110 is idle.

Figure 2:
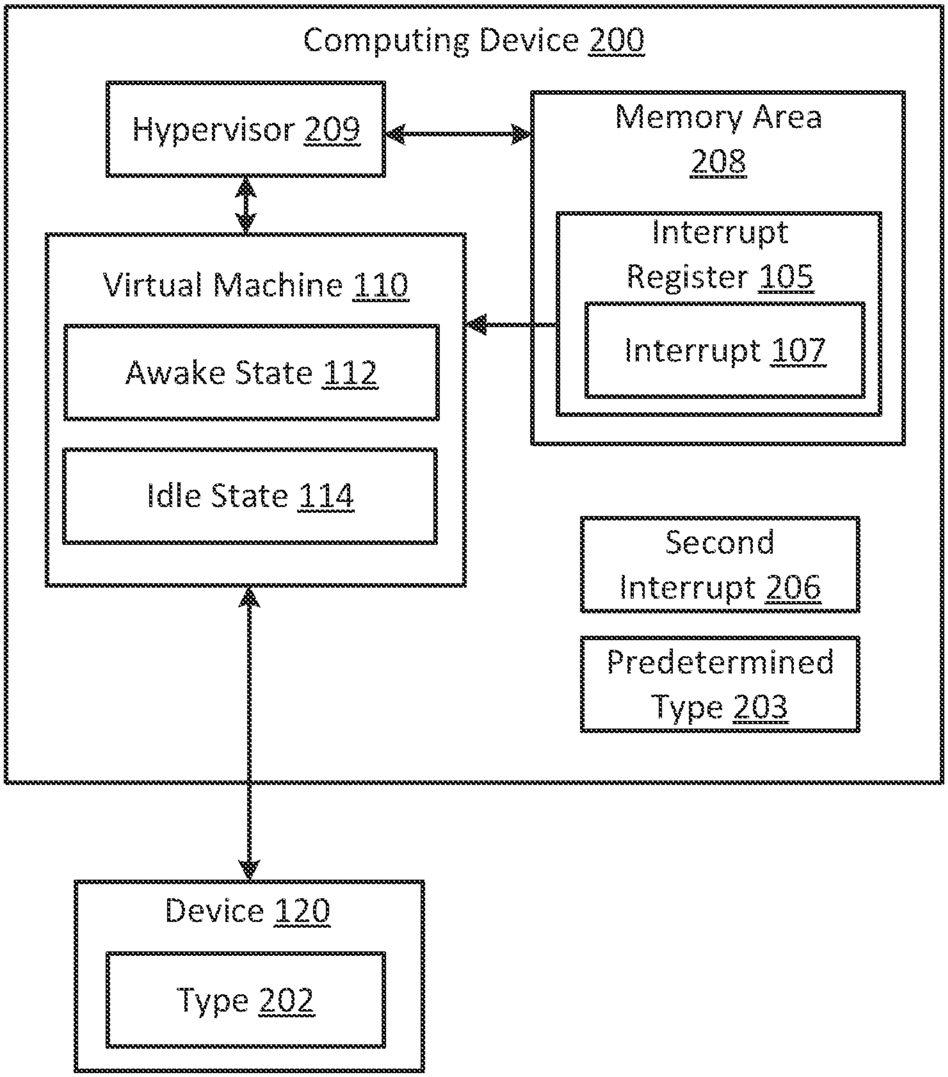
FIG. 2 is a block diagram of an example of a computing device that can delay interrupts for virtual machines according to some aspects of the present disclosure.

FIG. 2 is a block diagram of another example of a computing device 200 that can delay interrupts for virtual machines according to some aspects of the present disclosure. The computing device 200 can include a virtual machine 110. The virtual machine 110 can be a software emulation of a separate physical computer. The computing device 200 can allocate computing resources to the virtual machine 110 for enabling the virtual machine 110 to execute processes.

In some examples, the computing device 200 can generate an interrupt 107 associated with adding a device 120 to the virtual machine 110 or removing the device 120 from the virtual machine 110. To determine how to handle the interrupt 107, the computing device 200 can determine whether the virtual machine 110 is in an idle state 114. If so, the computing device 200 can delay delivery of the interrupt 107 to the virtual machine 110 by storing the interrupt 107 in an interrupt register 105 for a period of time. For example, the computing device 200 can store the interrupt 107 in a posted interrupt register that may be associated with the virtual machine 110. In some examples, the interrupt register 105 can be located in a memory area 208 for a hypervisor 209 that can manage the virtual machine 110. For example, the hypervisor 209 can manage the lifecycle of the virtual machine 110 and alter runtime parameters associated with the virtual machine 110. Examples of a hypervisor 209 can include Oracle VM VirtualBox, VMware Server and Workstation, Microsoft Virtual PC, KVM, and QEMU. During the period of time in which the interrupt 107 is stored in the interrupt register 105, the computing device 200 can prevent the interrupt 107 from being transmitted to the virtual machine 110.

At a later point in time, the computing device 200 can determine that the virtual machine is in an awake state 112. For example, the computing device 200 can interact with the hypervisor 209 to determine whether the virtual machine 110 is idle or awake. Based on determining that the virtual machine 110 is in the awake state 112, the computing device 200 can transmit the interrupt 107 from the interrupt register 105 to the virtual machine 110. The computing device 200 may also delete the interrupt 107 from the interrupt register 105.

The device 120 can be of a particular type 202. In some examples, the computing device 200 can detect the type 202. For example, the computing device 200 can transmit a request to the device 120 to provide the computing device 200 with information associated with the type 202 of the device. The type 202 can indicate a functionality of the device 120 and whether the device 120 is a hardware device 120 or a virtual device 120. If the type 202 matches a predetermined type 203, which may be specified in a delay list describing a set of devices for which interrupts are to be delayed, the computing device 200 can delay the interrupt 107 by storing the interrupt 107 in the interrupt register 105. If the type 202 is not on the delay list, the computing device 200 may transmit the interrupt 107 to the virtual machine 110 immediately (e.g., without delaying the interrupt 107 by storing it in the interrupt register 105).

Figure 3:
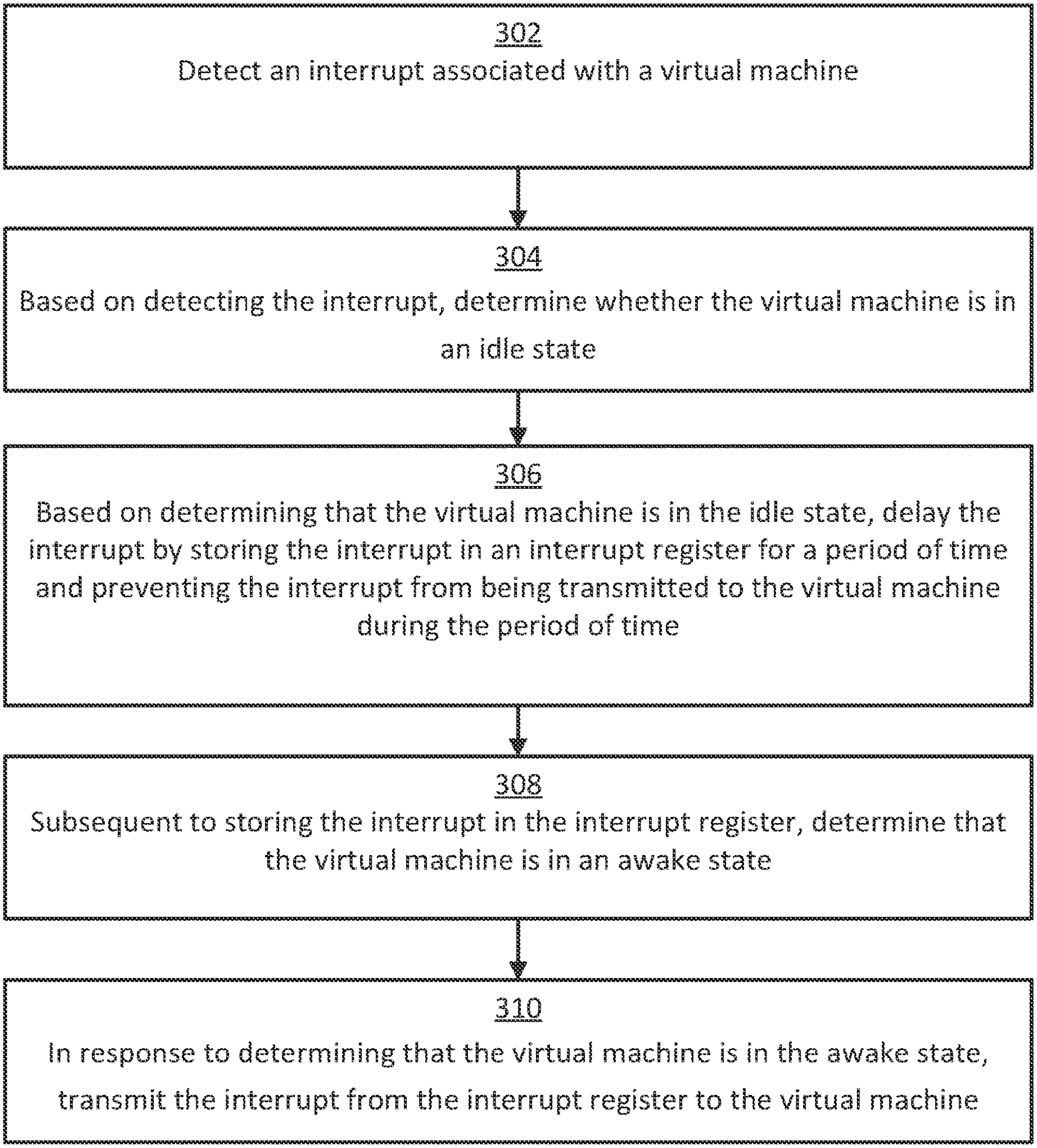
FIG. 3 is a flow chart of a process for delaying interrupts for virtual machines according to some aspects of the present disclosure.

FIG. 3 is a flow chart of a process for delaying interrupts 107 for virtual machines according to some aspects of the present disclosure. Other examples may include more steps, fewer steps, different steps, or a different order of steps than is shown in FIG. 3. The steps of FIG. 3 will be described below with reference to the components of FIG. 1 and FIG. 2 described above.

At block 302, a processor 102 can detect an interrupt 107 associated with a virtual machine 110. For example, the interrupt 107 can be associated with adding a device 120 to the virtual machine 110 or removing the device 120 from the virtual machine 110. In some examples, the processor 102 can sample for the interrupt 107 at or before the beginning of an instruction cycle associated with the processor 102. In some examples, the interrupt 107 can be associated with removing a device 120 from the virtual machine 110. The device 120 can be a hardware device 120, such as a physical network card or a physical hard drive. Alternatively, the device 120 can be a virtual device 120, such as a computer program that can be allotted a quantity of computing resources from the computing device for enabling the virtual device to emulate a hardware device. The computing resources can include an amount of processing power or memory space that can be allotted to the virtual machine 110 for enabling the virtual machine 110 to execute processes. In some examples, the interrupt 107 can cause the processor 102 to hot plug the device 120 into the virtual machine 110.

At block 304, the processor 102 can determine whether the virtual machine 110 is in an idle state 114. This determination can be made based on detecting the interrupt 107 associated with the virtual machine 110 in block 302. In some examples, the hypervisor 209 can determine whether or not the virtual machine 110 is in an idle state 114 and indicate the state of the virtual machine 110 accordingly.

At block 306, the processor 102 can, based on determining that the virtual machine 110 is in the idle state 114, delay the interrupt 107 by storing the interrupt 107 in an interrupt register 105 for a period of time. Alternatively, the processor can store the interrupt 107 in any other suitable pre-defined address in the memory 104. The processor 102 can also prevent the interrupt 107 from being transmitted to the virtual machine 110 during the period of time. The processor 102 can store the interrupt 107 in any other suitable interrupt register 105 that can store the interrupt 107 while the virtual machine 110 is in the idle state 114.

At block 308, subsequent to storing the interrupt 107 in the interrupt register 105, the processor 102 can determine that the virtual machine 110 is in an awake state 112. For example, the processor 102 can interface with a hypervisor 209 to determine the state of the virtual machine 110. As another example, the processor 102 can receive a second interrupt 206 that can indicate that the virtual machine 110 is in the awake state 112. Based on the second interrupt 206, the processor 102 can determine that the virtual machine 110 is in the awake state 112. In some examples, the processor 102 can automatically transmit the interrupt 107 once the processor 102 has determined that the period of time has elapsed.

At block 310, the processor 102 can transmit the interrupt 107 from the interrupt register 105 to the virtual machine 110, in response to determining that the virtual machine 110 is in the awake state 112. In some examples, the interrupt 107 can enable the virtual machine 110 to add a new device 120 to the virtual machine 110. Alternatively, the interrupt 107 can cause the virtual machine 110 to remove an existing device 120 from the virtual machine 110. Adding the new device 120 can involve hot plugging the device 120 into the virtual machine 110. Similarly, removing the existing device 120 can involve hot unplugging the device 120 from the virtual machine 110.

In some examples, the processor can transmit the interrupt 107 to the hypervisor 209. The hypervisor 209 can generate a virtual hardware interrupt corresponding to the interrupt 107. The processor 102 can transmit the virtual hardware interrupt to virtual hardware that may be associated with the virtual machine 110. In some examples, the virtual machine 110 can include a virtual processor with one or more virtual processor cores that can execute processes. The virtual hardware interrupt can halt execution of the virtual processor or one or more of the virtual processor cores to enable the virtual processor to handle the virtual hardware interrupt corresponding to the interrupt 107. In some examples, the hypervisor 209 can include a virtual distributor program or other program that can virtualize the interrupt 107. In some examples, the virtual distributor program can convert the interrupt 107 into the virtual hardware interrupt. In some examples, the interrupt 107 can halt the execution of a program in the virtual machine 110 to enable the virtual machine 110 to execute a process associated with the interrupt 107. In examples where there is more than one virtual machine 110, the hypervisor 209 can route the interrupt 107 to the correct virtual machine 110.

In an illustrative example, it may be possible to transfer the device 120 from the virtual machine 110 to a second virtual machine. For example, the processor 102 can determine that the virtual machine 110 is in an awake state 114. Once the processor 102 has determined that the virtual machine 110 is in the awake state 114, the processor 102 can transmit a first interrupt 107 to the virtual machine 110. The first interrupt 107 can cause the processor 102 to hot unplug the device 120 from the virtual machine 110, so that the device 120 is removed from the virtual machine 110. Subsequent to removing the device 120 from the virtual machine 110, the processor 102 can issue a command to delete the first interrupt 107 from the interrupt register. Once the device 120 has been removed from the virtual machine 110, the processor 102 can issue a second interrupt associated with adding the device 120 to the second virtual machine 110. The processor 102 can store the second interrupt in the interrupt register 105 for a period of time. For example, the processor 102 can store the second interrupt in the interrupt register 105 until the processor 102 has determined that the second virtual machine is in an awake state 114. For example, the processor 102 can interact with a hypervisor 209 managing the second virtual machine to determine that the second virtual machine is in an awake state 114.

In response to determining that the second virtual machine is in an awake state 114, the processor 102 can transmit the second interrupt from the interrupt register 105 to the second virtual machine. This can cause the device 120 to be added to the second virtual machine. For example, the processor can hot plug the device 120 into the second virtual machine. Hot plugging the device 120 into the second virtual machine can involve adding the device 120 into the second virtual machine without requiring the second virtual machine 110 to restart, shut down, or otherwise disrupt the lifecycle of the second virtual machine 110.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by a processor to:
- detect a first interrupt associated with a first device, wherein the first interrupt is intended for a virtual machine;
- based on detecting the first interrupt:
  - determine whether the virtual machine is in an idle state;
  - determine that a first device type associated with the first device is on a list of device types for which interrupts are to be delayed at least until the virtual machine is awakened by an event other than the first interrupt; and
  - based on determining that the virtual machine is in the idle state, and that the first device type is on the list of device types for which interrupts are to be delayed at least until the virtual machine is awakened by an event other than the first interrupt, delay the first interrupt by storing the first interrupt in an interrupt register and preventing the first interrupt from being transmitted to the virtual machine at least until the virtual machine is awakened by an event other than the first interrupt, such that the first interrupt is not used as a basis for awakening the virtual machine from the idle state;
- subsequent to storing the first interrupt in the interrupt register to delay delivery of the first interrupt to the virtual machine:
  - determine that the virtual machine is in an awake state; and
  - in response to determining that the virtual machine is in the awake state, release the delay by transmitting the first interrupt from the interrupt register to the virtual machine, thereby ending the delay of the first interrupt;
- detect a second interrupt associated with a second device that is different from the first device, wherein the second interrupt is also intended for the virtual machine;
- determine that a second device type associated with the second device is not on the list of device types for which interrupts are to be delayed; and
- based on determining that the second device type is not on the list of device types for which interrupts are to be delayed, transmit the second interrupt to the virtual machine without delaying the second interrupt and without storing the second interrupt in the interrupt register.

2. The non-transitory computer-readable medium of claim 1, wherein the interrupt register is located in a memory area for a hypervisor configured to manage the virtual machine.

3. The non-transitory computer-readable medium of claim 1, wherein the first interrupt is associated with adding the first device to the virtual machine.

4. The non-transitory computer-readable medium of claim 1, wherein the first interrupt is associated with removing the first device from the virtual machine.

5. The non-transitory computer-readable medium of claim 2, wherein the interrupt register is a posted interrupt register of a virtual central processing unit associated with the virtual machine.

6. The non-transitory computer-readable medium of claim 1, further comprising program code that is executable by the processor to:
- in response to detecting the second interrupt, determine that the virtual machine is in the awake state.

7. The non-transitory computer-readable medium of claim 1, wherein the virtual machine transitions from the idle state to the awake state independently of the first interrupt.

8. A method comprising:
- detecting, by a processor, a first interrupt associated with a first device, wherein the first interrupt is intended for a virtual machine;
- based on detecting the first interrupt:
  - determining, by the processor, whether the virtual machine is in an idle state;
  - determining, by the processor, that a first device type associated with the first device is on a list of device types for which interrupts are to be delayed at least until the virtual machine is awakened by an event other than the first interrupt; and
  - based on determining that the virtual machine is in the idle state, and that the first device type is on the list of device types for which interrupts are to be delayed at least until the virtual machine is awakened by an event other than the first interrupt, delaying, by the processor, the first interrupt by storing the first interrupt in an interrupt register and preventing the first interrupt from being transmitted to the virtual machine at least until the virtual machine is awakened by an event other than the first interrupt, such that the first interrupt is not used as a basis for awakening the virtual machine from the idle state;
- subsequent to storing the first interrupt in the interrupt register to delay delivery of the first interrupt to the virtual machine:
  - determining, by the processor, that the virtual machine is in an awake state; and
  - in response to determining that the virtual machine is in the awake state, releasing, by the processor, the delay by transmitting the first interrupt from the interrupt register to the virtual machine, thereby ending the delay of the first interrupt;
- detecting, by the processor, a second interrupt associated with a second device that is different from the first device, wherein the second interrupt is also intended for the virtual machine;
- determining, by the processor, that a second device type associated with the second device is not on the list of device types for which interrupts are to be delayed; and
- based on determining that the second device type is not on the list of device types for which interrupts are to be delayed, transmitting, by the processor, the second interrupt to the virtual machine without delaying the second interrupt and without storing the second interrupt in the interrupt register.

9. The method of claim 8, wherein the first interrupt is associated with adding the first device to the virtual machine.

10. The method of claim 8, wherein the first interrupt is associated with removing the first device from the virtual machine.

11. The method of claim 9, wherein the interrupt register is a posted interrupt register of a virtual central processing unit associated with the virtual machine.

12. The method of claim 8, further comprising:
- in response to detecting the second interrupt, determining, by the processor, that the virtual machine is in the awake state.

13. The method of claim 8, wherein the virtual machine transitions from the idle state to the awake state independently of the first interrupt.

14. The method of claim 8, further comprising:
- detecting a transition of the virtual machine from the idle state to the awake state; and
- in response to detecting the transition of the virtual machine from the idle state to the awake state, releasing the delay of the first interrupt by transmitting the first interrupt from the interrupt register to the virtual machine.

15. A system comprising:
- a processor; and
- a memory comprising instructions that are executable by the processor to:
  - detect a first interrupt associated with a first device, wherein the first interrupt is intended for a virtual machine;
  - based on detecting the first interrupt:
    - determine whether the virtual machine is in an idle state;
    - determine that a first device type associated with the first device is on a list of device types for which interrupts are to be delayed at least until the virtual machine is awakened by an event other than the first interrupt; and
    - based on determining that the virtual machine is in the idle state, and that the first device type is on the list of device types for which interrupts are to be delayed at least until the virtual machine is awakened by an event other than the first interrupt, delay the first interrupt by storing the first interrupt in an interrupt register and preventing the first interrupt from being transmitted to the virtual machine at least until the virtual machine is awakened by an event other than the first interrupt, such that the first interrupt is not used as a basis for awakening the virtual machine from the idle state;
  - subsequent to storing the first interrupt in the interrupt register to delay delivery of the first interrupt to the virtual machine:
    - determine that the virtual machine is in an awake state; and
    - in response to determining that the virtual machine is in the awake state, release the delay by transmitting the first interrupt from the interrupt register to the virtual machine, thereby ending the delay of the first interrupt;
  - detect a second interrupt associated with a second device that is different from the first device, wherein the second interrupt is also intended for the virtual machine;
  - determine that a second device type associated with the second device is not on the list of device types for which interrupts are to be delayed; and
  - based on determining that the second device type is not on the list of device types for which interrupts are to be delayed, transmit the second interrupt to the virtual machine without delaying the second interrupt and without storing the second interrupt in the interrupt register.

16. The system of claim 15, wherein the interrupt register is located in a memory area for a hypervisor configured to manage the virtual machine.

17. The system of claim 15, wherein the first interrupt is associated with adding the first device to the virtual machine.

18. The system of claim 15, wherein the first interrupt is associated with removing the first device from the virtual machine.

19. The system of claim 16, wherein the interrupt register is a posted interrupt register of a virtual central processing unit associated with the virtual machine.

20. The system of claim 16, wherein the virtual machine transitions from the idle state to the awake state independently of the first interrupt.

* * * * *